Aug. 7, 1951 — C. B. DOTY ET AL — 2,563,221
AUTOMOBILE BODY SIDE AND ROOF ASSEMBLY
Filed Nov. 6, 1946 — 2 Sheets-Sheet 1

INVENTORS.
Clifford B. Doty,
Trygve Vigmostad.
BY Elmer Jamison Gray
ATTORNEY.

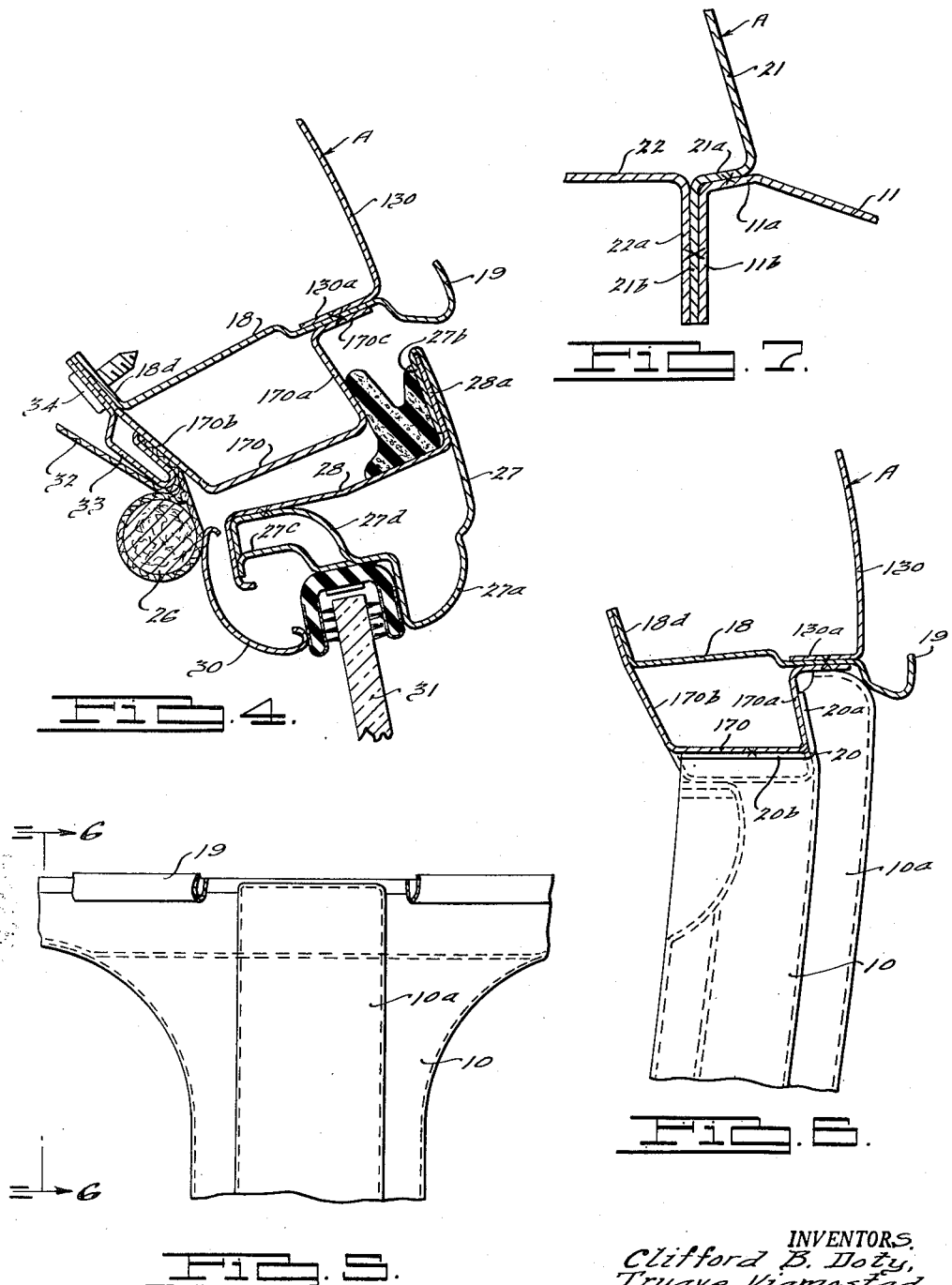

Patented Aug. 7, 1951

2,563,221

UNITED STATES PATENT OFFICE 2,563,221

AUTOMOBILE BODY SIDE AND ROOF ASSEMBLY

Clifford B. Doty and Trygve Vigmostad, Detroit, Mich., assignors to Briggs Manufacturing Company, Detroit, Mich., a corporation of Michigan Application November 6, 1946, Serial No. 708,127

9 Claims. (Cl. 296—28)

This invention relates to vehicle bodies and particularly automobile bodies, one of the objects or purposes thereof being to improve the construction and fabrication of an automobile body or the like so as to simplify the same, reduce the cost of manufacture such as by enabling the side and roof assemblies to be joined together more quickly and easily, and in addition to strengthen and stiffen the body in respect to certain important structural portions thereof.

A further object of the invention is to provide an automobile or similar vehicle body of the type fabricated principally of pressed metal parts wherein the front pillars adjacent the windshield are each formed into a double box section upon consolidating together the roof and side assemblies, thereby providing a pillar construction having maximum strength and rigidity while at the same time having a minimum of thickness or depth in two directions so as to improve the vision of the front seat occupant of the vehicle.

Another object of the invention is to provide in an automobile or similar vehicle body a front pillar construction of the foregoing construction in which the intermediate or dividing transverse wall of the double box structure is formed by an extension of the drip molding.

Still another object of the invention is to provide an improved vehicle body structure in which the door header extending along each side of the body above the door opening or openings is in the form of a strong and rigid box section to which the flanged depending side of the roof panel may be easily attached.

A further object of the invention is to provide a door header structure of the foregoing description in which the top closing wall of the box section is formed by an inward extension of the drip molding.

The above and other objects and advantages of the present invention will appear from the following description and appended claims when considered in connection with the accompanying drawings forming a part of this specification wherein like reference characters designate corresponding parts in the several views.

Fig. 4 is an enlarged section taken substantially through lines 4—4 of Fig. 1 looking in the direction of the arrows.

Fig. 5 is a fragmentary elevation illustrating the upper part of the center pillar.

Fig. 6 is a section taken through the door header structure substantially from lines 6—6 of Fig. 5 looking in the direction of the arrows.

Fig. 7 is an enlarged section taken substantially through lines 7—7 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
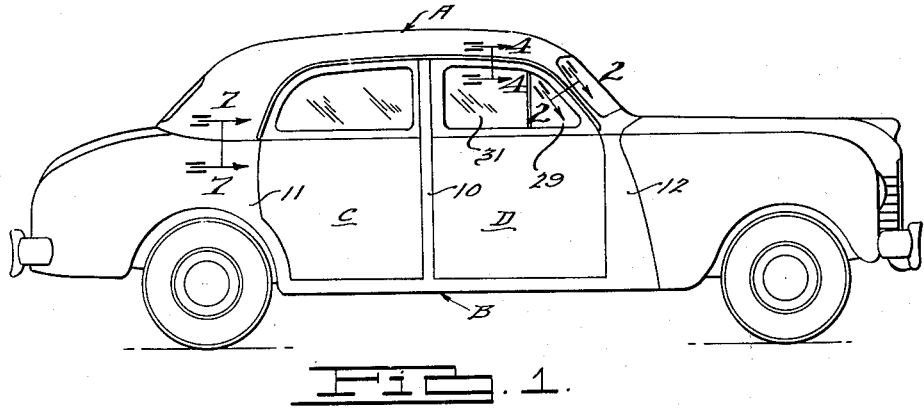
Fig. 1 is a side elevation of an automobile body constructed in accordance with the present invention.

In Fig. 1 of the drawings we have illustrated an automobile body having a main roof assembly A formed principally from a single pressed metal sheet, and two side assemblies B, each of which is a unitary structure adapted to be consolidated as a unit with the roof assembly as by spot-welding. A four-door automobile body is shown by way of example, this body having two doors C and D at each side. The single pressed metal roof panel extends down and back to the rear deck opening and in front along opposite sides of the windshield opening at least to the cowl. Each side assembly B includes a top header extending along the side edge of the roof panel over the door opening or openings, a center pillar 10, a rear quarter panel 11, and a front cowl panel 12. In the case of a two-door automobile body the center pillar will, of course, be omitted and it is to be understood that the present invention is applicable to automobile bodies of both the two-door and four-door types.

Figure 2:
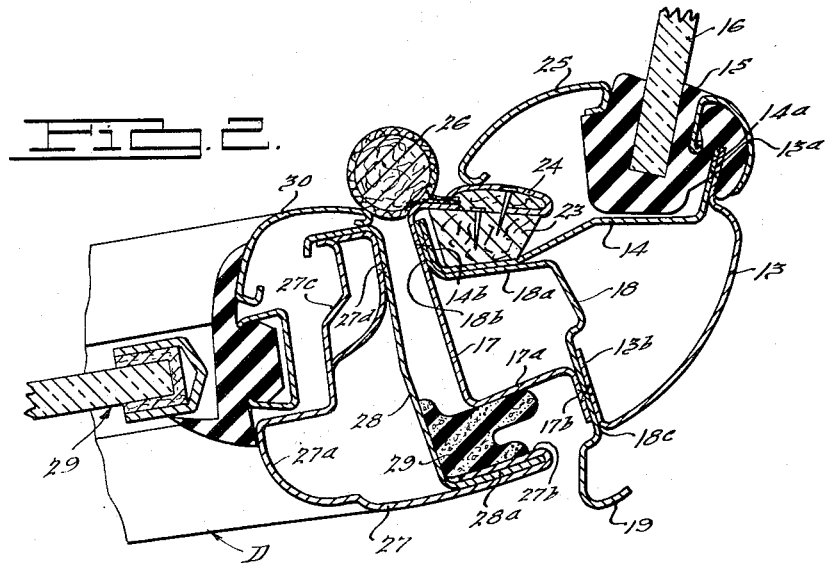
Fig. 2 is an enlarged section taken substantially through lines 2—2 of Fig. 1 looking in the direction of the arrows.

The roof assembly comprises a unitary pressed metal roof panel terminating over its major width at the upper edge of the windshield opening but provided along each side of the windshield with a downwardly sloping front pillar extension 13 suitably contoured as illustrated in Fig. 2. Along each side of the windshield there is provided a pressed metal reinforcing member 14 which is spaced over its major width inwardly of the roof panel extension 13 to form therewith three sides of a box-like section. The roof panel extension 13 has an inwardly directed flange 13a extending substantially parallel to the windshield 16, and the member 14 also has a flange 14a engaging the flange 13a and spot welded thereto. These flanges are embedded in a rubber sealing strip 15 which in turn receives the edge of the windshield 16.

Extending along the front upright edge of the front door opening is a front pillar member 17 which forms the front jamb of the door. This member is part of the unitary side assembly B and is pressed to form a forwardly extending flange 17a which in turn has its outer edge turned outwardly to provide a flange 17b. Thus, the pillar member 17 with its angular flange 17a forms two sides of a box section. The other two sides of this box section are formed by means of a pressed metal member 18 which is in the nature of an inward extension of a drip molding or drain trough 19 extending contiguously around the door openings above the belt line of the body. The extension 18 of the drip molding, as shown in Fig. 2, is flanged rearwardly at 18a to meet the pillar member 17 and is thence formed with an inward flange 18b engaging the pillar member and spot welded thereto. The drip molding extension 18 has a portion 18c which overlies the flange 17b and is spot welded thereto in the fabrication of the unitary side assembly. The roof panel extension 13 terminates at its rear edge in an inwardly extending flange 13b which, when the roof is consolidated with the side assembly, is spot welded to the overlying welded-together portions 17b and 18c.

The inner reinforcing or windshield framing member 14 has a portion thereof extending contiguously with respect to the flange 18a and terminates in an inwardly extending flange 14b which is spot welded to the welded-together portions 18b and 17 when the roof and sides of the body are assembled together.

Thus, it will be seen from the foregoing that the pillar structure is in the nature of a double box section formed by the parts 13, 14, 17 and 18 with the drip molding extension 18 forming in common one of the walls or sides of each box section.

In the present embodiment of the invention the pillar member 17 extends upwardly and thence rearwardly along the upper edge of the door openings and thence downwardly along the rear edge of the rear door opening. Thus, as shown in Fig. 4, the pillar extension 17 merges into the door header 170, forming a part thereof, and this door header becomes, by pressing operations, an upwardly opening channel comprising a bottom web and spaced side flanges 170a and 170b. The upper edge of the outer flange 170a is formed with an outturned flange 170c which underlies and engages the drip molding extension 18. In the formation of the unitary side assembly B the flange 170c is spot welded to the drip molding extension 18 and the latter is formed at its inner edge with an upturned flange 18d which is spot welded to the upper edge portion of the header flange 170b. Thus, it will be seen from Fig. 4 that the drip molding extension 18 closes the open side of the channel shaped header 170 and forms therewith a box section extending the full length of the upper edges of the door openings. Each depending side 130 of the roof panel has an inwardly extending flange 130a which rests upon the overlapped portions of the drip molding extension 18 and the header flange 170c, and when the roof is assembled with the side assembly B the flange 130a thereof is spot welded to the flange 170c and the adjacent portion of the drip molding extension.

As illustrated in Fig. 6, the box like door header is joined to the upper end of the center pillar 10. This pillar is channel shape in cross-section in accordance with conventional practice being outwardly embossed throughout its length at 10a to permit the doors when closed to lie flush therewith. The top of the pillar is notched to receive a reinforcing angle 20 having flanges 20a and 20b spot welded to the pillar and also to the adjacent sides of the door header 170.

As illustrated in Fig. 7, the rear depending portion 21 of the roof panel A is flanged inwardly at 21a and thence downwardly at 21b. The rear quarter panel 11 is formed with a flat ledge 11a terminating in a depending flange 11b. The ledge 11a and depending flange 11b engage the portions 21a and 21b of the roof panel and are spot welded thereto. Extending across the back of the tonneau behind the rear seat is a package tray 22 which is in the form of a pressed metal panel having at its end a depending flange 22a extending in juxta position to the flange 21b of the roof panel and spot welded thereto.

Referring to Fig. 2, a tacking strip 23 is secured to the member 14 and the usual fabric covered trim strip 24 is attached to this tacking strip. The gap between the trim strip 24 and the windshield sealing strip 15 is closed by means of a garnish molding 25. Also secured to the tacking strip is a fabric covered flexible windlace 26.

The front door D, as shown in Fig. 2, comprises the usual outer panel 27 which is flanged inwardly at 27a to form the window reveal. The frame of the door includes a jamb member 28 flanged outwardly at 28a and secured to the outer panel by crimping the edge 27b of the outer panel around the flange 28a. The flanging of the outer door panel around the window reveal is extended inwardly at 27c and formed with embossments 27d spot welded to the frame member 28 in accordance with conventional practice. The inside of the window reveal is finished by means of the usual garnish molding 30 which cooperates with the rubber sealing strips forming part of the glass wing assembly 29 which together with the sliding glass panel 31 form the closures for the window opening in the front door. As illustrated in Fig. 4, the head lining 32 is held in position along its edges by means of retainers 33 secured by means of screws 34 to the overlapping flanges 18d and 170b of the door header structure.

Figure 3:
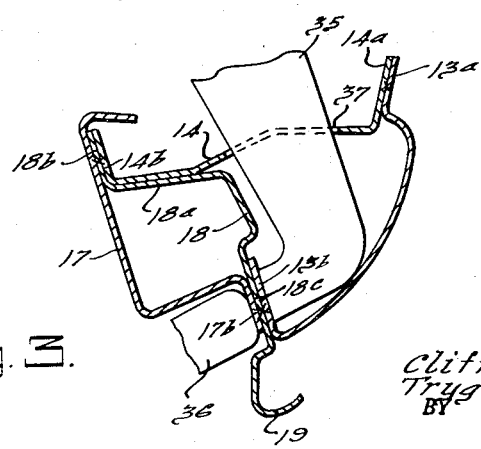
Fig. 3 is a view in part similar to Fig. 2 illustrating the method of spot welding together certain overlapping portions of the front pillar structure.

In assembling the roof panel with the front pillar structure 17, 18 of the unitary side assembly, the portions 13a and 17b are spot welded to the intervening portion 18c of the drip molding extension 18. This is accomplished, as shown in Fig. 3, by means of electrodes 35 and 36. The electrode 35 is inserted through slots or apertures 37 provided at intervals in the reinforcing member 14 of the front box section. In this manner these portions of the double box section may be readily and easily spot welded together while it will be apparent that the remaining exposed portions of the double box section may be spot welded together without difficulty.

We claim:

1. In a vehicle body, a door header and front pillar structure comprising a member pressed from sheet metal to provide two sides of a box section, a drip molding having an inward extension pressed to provide two sides of said box section, the outer side of said member terminating in an outwardly directed flange engaging said molding extension and secured thereto, said molding extension terminating in an inwardly directed flange engaging the inner side of said member and secured thereto, and a body panel having an inwardly directed flange secured in overlapping relation to said molding extension and said outwardly directed flange.

2. In a vehicle body, a door header and front pillar structure comprising a member pressed from sheet metal to provide two sides of a box section, a drip molding having an inward extension pressed to provide two sides of said box section and secured to said member to form the box section, and a roof panel terminating at one side edge in an inwardly directed flange engaging overlapping portions of said drip molding extension and member and secured thereto.

3. In a vehicle body, a door header structure comprising a member pressed from sheet metal to provide two sides of a box section, a drip molding having an inward extension pressed to provide the two remaining sides of said box section, said member terminating at its outer edge in an outwardly directed flange engaging said molding extension and secured thereto, and said molding extension terminating at its inner edge in an inwardly directed flange engaging said member and secured thereto, and a roof panel terminating at one side edge in an inwardly directed flange engaging said molding extension and secured thereto and to said outwardly directed flange.

4. In a vehicle body, a front upright pillar structure extending along one side of the windshield opening and formed from two adjacent front and rear box-like sections, the rear box-like section comprising a pressed metal door jamb member and a second pressed metal member each pressed to form two sides of the rear box-like section and having overlapping portions secured together, and the front box-like section comprising two outer and inner pressed metal members joined together adjacent two corresponding ends and secured adjacent opposite ends thereof to said overlapping portions, said second member forming one common side of said box-like sections and terminating at its outer edge in a drip molding disposed exteriorly of the pillar structure.

5. In a vehicle body, a pressed metal roof panel having a relatively narrow hollow extension lying along one side of a windshield opening, a pillar member formed with a door jamb portion, and a drip molding having an inwardly extending portion interposed between and secured at a common point to said extension and pillar member and forming therewith two adjacent box-like sections.

6. In a vehicle body having a pressed metal roof panel, a front pillar structure extending along a side of the windshield opening compris-ing a door jamb member angularly formed to provide two sides of a box-like section and terminating in an outwardly directed flange, an extension of said roof panel formed with an inwardly directed flange overlying the flange of said jamb member, and pressed metal means forming with said extension a box-like section and secured to said extension and jamb member at the locality of said flanges, said means also forming with said jamb member a second box-like section.

7. In a vehicle body, a door header structure comprising an upwardly opening channel member pressed from sheet metal to provide three sides of a box section extending along the top of the door opening, the outer one of said sides having an outwardly directed flange, and a drip molding having an inward extension overlying and secured to said flange and forming the fourth side of the said box section, said extension terminating in a flange secured to the inner one of said sides of the box section.

8. In a vehicle body, a door header structure comprising an upwardly opening channel member pressed from sheet metal to provide three sides of a box section, a drip molding having an inward extension overlying said member and forming the fourth side of the said box section, said member and molding extension having overlapping portions, and a roof panel terminating at one side edge in an inwardly directed flange engaging said overlapping portions and secured thereto.

9. In a vehicle body, a door header and front pillar structure comprising a member pressed from sheet metal to provide a facing for a door jamb and an outwardly extending offset flange, a drip molding having an inward extension secured to said flange and extending inward in spaced relation to said facing, said inward extension terminating in an inwardly extending offset flange secured to said facing, and a roof panel terminating at one side edge in an inwardly directed flange secured to said inward extension of the drip molding and to the flange of said member.

CLIFFORD B. DOTY.
TRYGVE VIGMOSTAD.

REFERENCES CITED

The following references are of record in the file of this patent:

UNITED STATES PATENTS

| Number | Name | Date |
|---|---|---|
| 2,205,797 | Ledwinka | June 25, 1940 |
| 2,248,319 | Waterhouse, Jr. | July 8, 1941 |

FOREIGN PATENTS

| Number | Country | Date |
|---|---|---|
| 511,210 | Great Britain | Aug. 15, 1939 |